United States Patent
Hsiao et al.

(10) Patent No.: US 7,946,722 B2
(45) Date of Patent: May 24, 2011

(54) BACKLIGHT MODULE WITH DETACHABLE BACK SLICE AND LIQUID CRYSTAL DISPLAY WITH SAME

(75) Inventors: Chih-Chung Hsiao, Miao-Li (TW); Mei-Fang Huang, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 145 days.

(21) Appl. No.: 12/322,452

(22) Filed: Feb. 2, 2009

(65) Prior Publication Data
US 2009/0196019 A1   Aug. 6, 2009

(30) Foreign Application Priority Data

Feb. 1, 2008   (CN) .......................... 2008 1 0066035

(51) Int. Cl.
*G09F 13/04*   (2006.01)
*G09F 13/08*   (2006.01)

(52) U.S. Cl. .......................... 362/97.2; 362/633; 349/58
(58) Field of Classification Search ........ 362/97.1–97.4, 362/632–634; 349/58, 60
See application file for complete search history.

(56) References Cited

U.S. PATENT DOCUMENTS

| 6,527,414 | B2 | 3/2003 | Moon |
| 6,979,114 | B2* | 12/2005 | Kao .............................. 362/633 |
| 7,287,879 | B2 | 10/2007 | Hsu |

FOREIGN PATENT DOCUMENTS

| CN | 1924656 A | 3/2007 |
| WO | 2006085408 A1 | 8/2006 |

\* cited by examiner

*Primary Examiner* — Jason Moon Han
(74) *Attorney, Agent, or Firm* — Wei Te Chung

(57) ABSTRACT

A direct backlight module comprises a first frame, at least two light sources, and a back board. The back board is fixed to the first frame and comprises at least two back slices connected to each other. Each of the at least back slices slips out from the back board.

14 Claims, 5 Drawing Sheets

BACKLIGHT MODULE WITH DETACHABLE BACK SLICE AND LIQUID CRYSTAL DISPLAY WITH SAME

FIELD OF THE DISCLOSURE

The present disclosure relates to backlight modules, and more particularly to a backlight module with a detachable back slice, and a liquid crystal display with the same.

GENERAL BACKGROUND

Liquid crystal displays (LCDs) are commonly used as display devices for compact electronic apparatuses, because they provide good quality images and they are also very thin. Because liquid crystal molecules in an LCD do not emit any light themselves, the liquid crystal molecules have to be lit by a separate light source so as to clearly and sharply display text and images. Therefore, LCDs usually require backlight modules. However, if these backlight modules become broken, it is often very difficult to replace them.

What is needed, therefore, is a backlight module that can overcome the above-described deficiency. What is also need is an LCD employing such a backlight module.

BRIEF DESCRIPTION OF THE DRAWINGS

The components in the drawings are not necessarily drawn to scale, the emphasis instead being placed upon clearly illustrating the principles of the present backlight module and LCD. In the drawings, like reference numerals designate corresponding parts throughout various views, and all the views are schematic.

DETAILED DESCRIPTION

Reference will now be made to the drawings to describe certain inventive embodiments of the present disclosure in detail.

Figure 1:
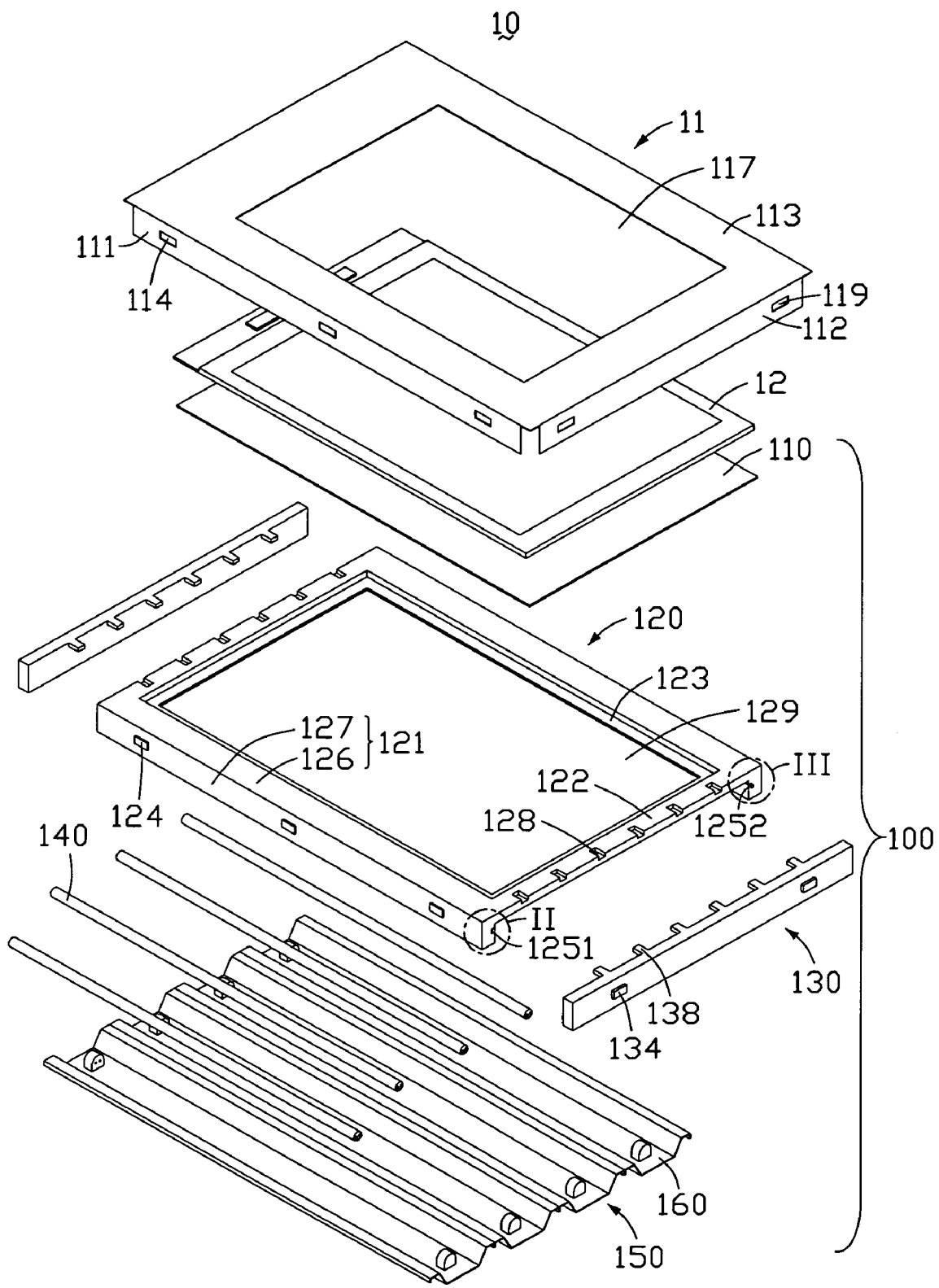
FIG. 1 is an exploded isometric view of an LCD according to a first embodiment of the present disclosure.

Referring to FIG. 1, an LCD 10 according to a first embodiment of the present disclosure includes a front frame 11, a liquid crystal panel 12, and a direct backlight module 100. The front frame 11 and the direct backlight module 100 collectively define a space to receive the liquid crystal panel 12.

The front frame 11 is rectangularly shape and includes two opposite first side walls 111, two opposite second side walls 112, and a rectangular connector 113 defining a hollow space 117 in a middle thereof. The two first side walls 111 and the two second side walls 112 extend towards to a same direction from edges of the connector 113 and are perpendicular to the connector 113. Each of the first side walls 111 includes three first holes 114 defined therein. Each of the second side walls 112 includes two second holes 119 therein. The hollow space 117 corresponds to an active area of the liquid crystal panel 12.

The direct backlight module 100 includes a diffuser 110, a plastic frame 120, two side covers 130, a back board 150, and a light source. The light source includes a plurality of lamps 140. The diffuser 110 is rectangularly shape. An area of the diffuser 110 is greater than the active area of the liquid crystal panel 12.

Figure 2:
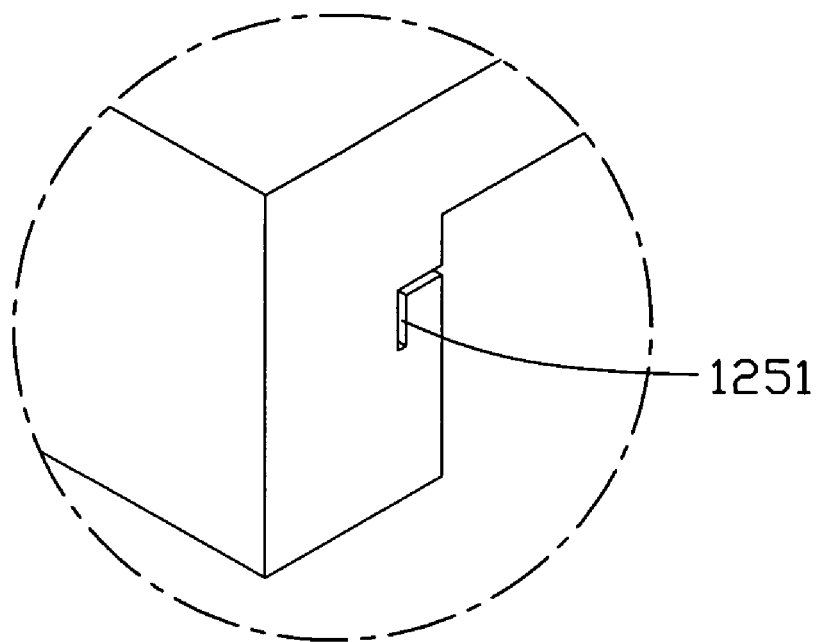
FIG. 2 is an enlarged view of a circled portion II of FIG. 1.
Figure 3:
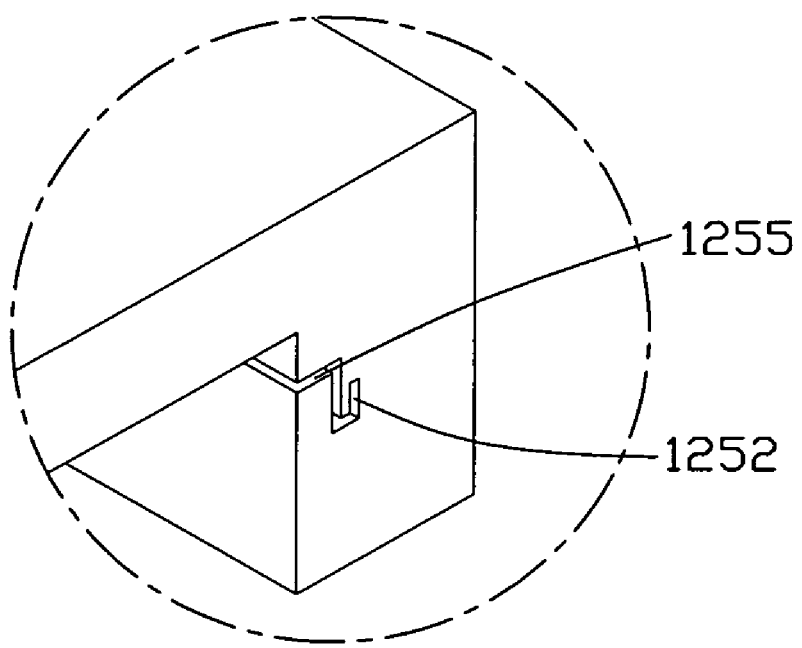
FIG. 3 is an enlarged view of a circled portion III of FIG. 1.
Figure 4:
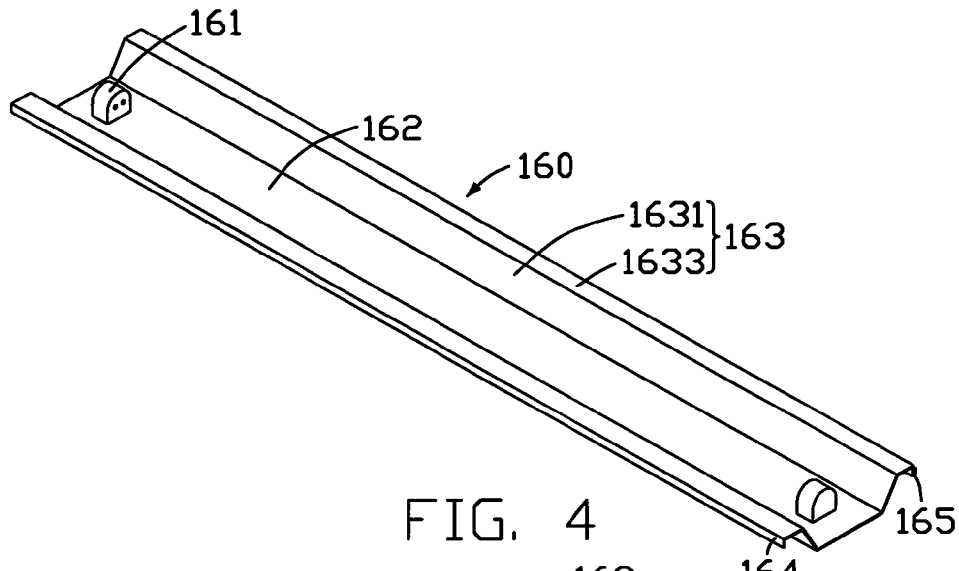
FIG. 4 is an enlarged isometric view of a back slice of the LCD of FIG. 1.
Figure 5:
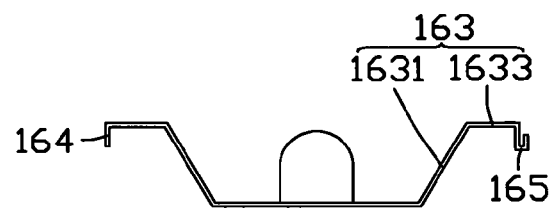
FIG. 5 is a side cross-sectional view of the back slice of FIG. 4.
Figure 6:
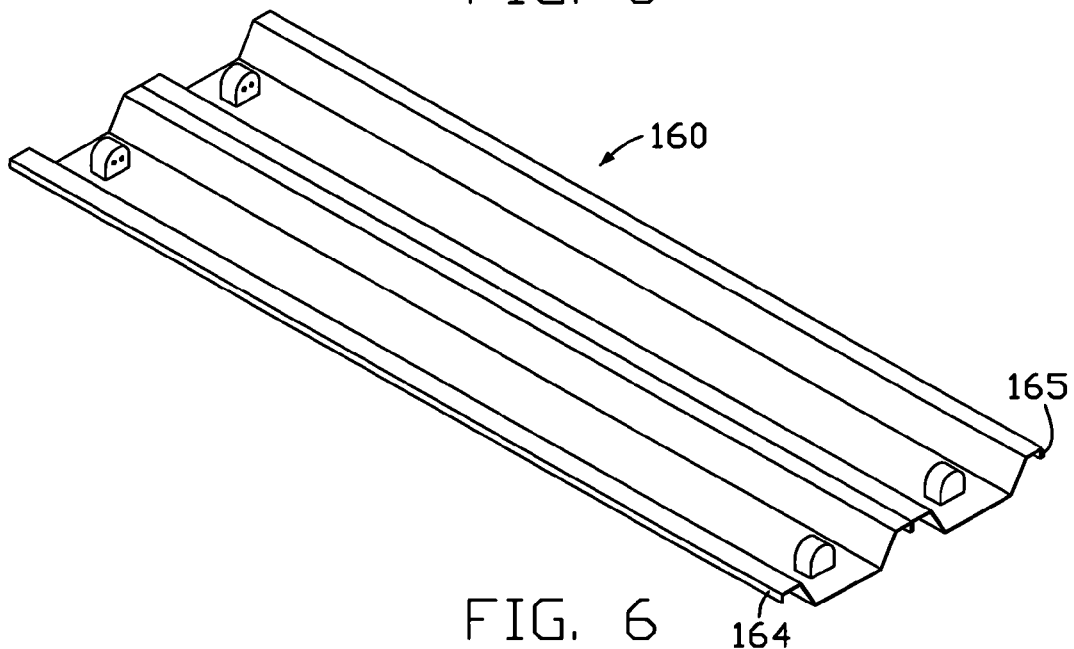
FIG. 6 is an enlarged isometric view of part of a back board of the LCD of FIG. 1.
Figure 7:
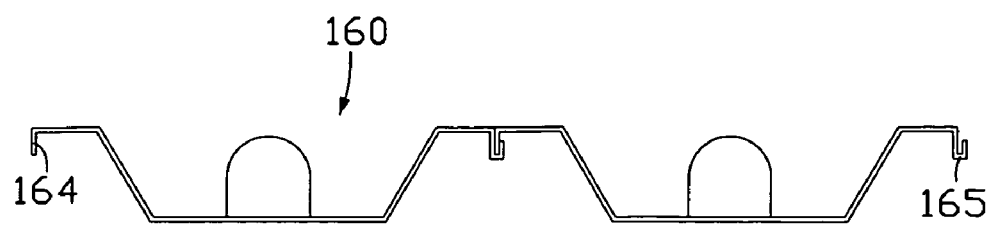
FIG. 7 is a side cross-sectional view of part of the assembled back board of FIG. 6.

The plastic frame 120 is rectangularly structure including an opening 129 defined in a middle thereof. The plastic frame 120 further includes two opposite first side arms 121 and two opposite second side arms 122. Each of the first side arms 121 includes a first arm part 126, and a second arm part 127 perpendicular to the first arm part 126. The two second arm parts 127 are parallel to each other, and extend along a same direction. The two first arm parts 126 and the two second side arms 122 define the opening 129. Each second arm part 127 includes three first protrusions 124 protruding diverge from the opening 129 and two channels 1251, 1252 adjacent to the opening 129. The first protrusions 124 correspond to the first holes 114 of the first side walls 111, respectively. The back board 150 is fixed to the plastic frame 120 via the channels 1251, 1252. Referring also to FIG. 2 and FIG. 3, a cross-section of the channel 1251 is substantially L-shaped. The channel 1252 includes a passageway 1255 and a U-shaped channel (not labeled). A cross-section of the passageway 1255 is a beeline (not labeled). The cross-section of the U-shaped channel is substantially U-shaped. An end of the U-shaped channel links to the cross-section of an inside surface of the second arm part 127 via the beeline. Each of the second side arms 122 includes a plurality of concavities 128. A support 123 extends towards the opening 129 from the two first arm parts 126 and the second side arms 122.

Each of the two side covers 130 is elongated along an axis. A surface of each side cover 130 includes two second protrusions 134. An opposite surface of each side cover 130 facing to the plastic frame 120 includes a plurality of tenons 138 extending perpendicular to the surface thereon. The second protrusions 134 correspond to the second holes 119. Each of the tenons 138 corresponds to the concavity 128. The second protrusions 134 correspond to the second holes 119.

Referring also to FIG. 4 to FIG. 7. The back board 150 includes a plurality of parallel back slices 160 connected to each other one by one. Each back slice 160 includes two holders 161, a back piece 162, and two linkers 163. The two linkers 163 hold the back piece 162 and form a room to receive the lamp 140. The back piece 162 is rectangularly shape. The two holders 161 are disposed on two opposite ends of a same surface of the back piece 162 which can hold the lamp 140 on the back slice 160. Each linker 163 includes a plank 1631, and a flake 1633 connecting to the plank 1631. The plank 1631 and the back piece 162 define an obtuse angle. The flake 1633 is parallel to the back piece 162. A first fasten organ, just like a slide 164, extends from an edge of one plank 1631 and is perpendicular to the back piece 162. A second fasten organ, just like a U-shaped chute 165, extends from an edge of the other plank 1631. An outline of the slide 164 corresponds to an inline of the U-shaped chute 165.

Figure 8:
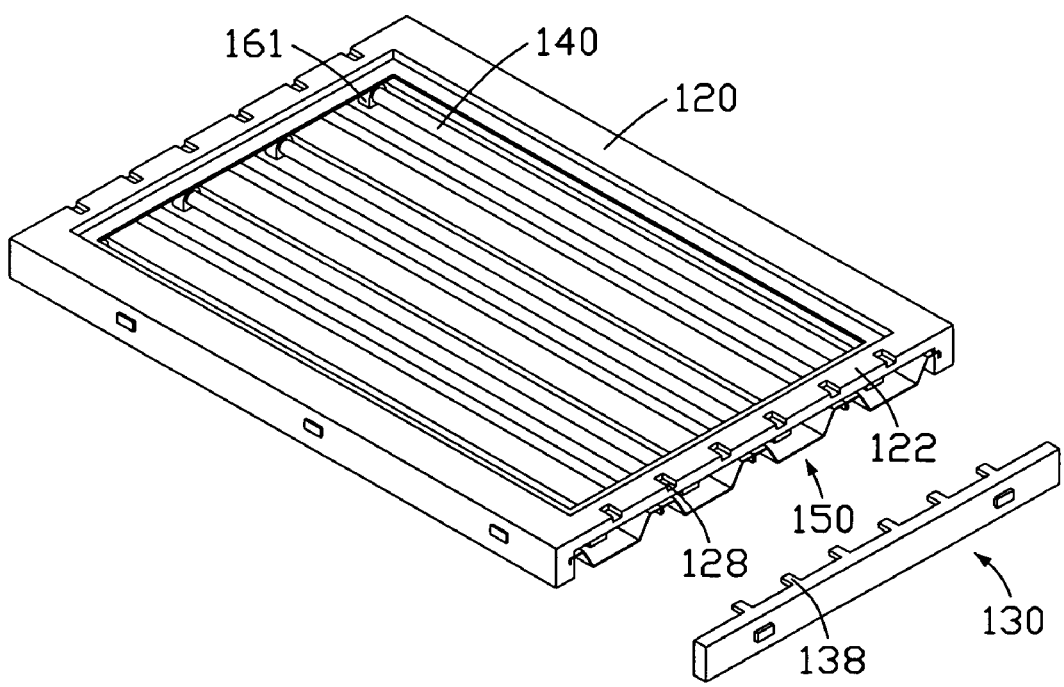
FIG. 8 is an assembled view of a backlight module of the LCD of FIG. 1, omitting a masking tape and a plurality of optical films thereof.
Figure 9:
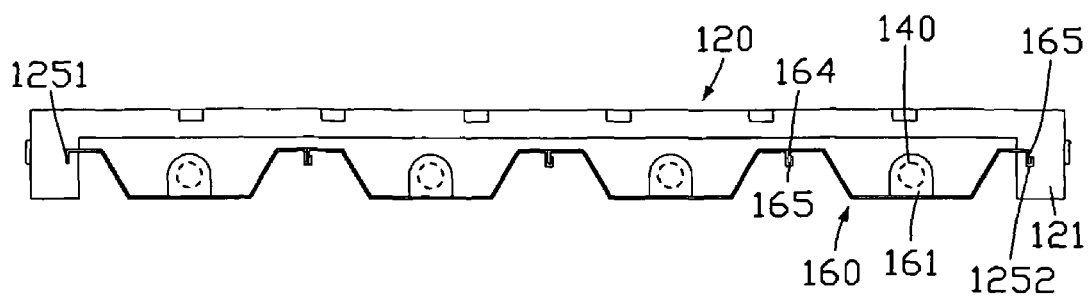
FIG. 9 is a side cross-sectional view of the assembled backlight module of FIG. 8, but omitting the diffuser thereof.

With reference to FIG. 8 and FIG. 9, the lamps 140 are received in back slices 160, respectively. Ends of the lamp 140 are held by the holders 161. One slide 164 of the back slice 160 slips into the other U-shaped chute 165 of the other back slice 160. The back slices 160 are connected to each other to form the back board 150 by using above method. The channel 1251 corresponds to receive the slide 164 and a part of the flake 1633. The channel 1252 receives the U-shaped chute 165 and a part of the flake 1633.

The tenons 138 of the side cover 130 are received in the concavities 128 of the second side arms 122, so as to fix the side cover 130 to the plastic frame 120. The diffuser 110 is disposed on the opening 129 and contacts with the support 123. The liquid crystal panel 12 is disposed between the front frame 11 and the direct backlight module 100. The first protrusions 124 and the second protrusions 134 are received in the first holes 114 and second holes 119 to fix the whole LCD 10. Each back slice 160 can be detached and associated freely from the back board 150 if the lamp 140 is damaged and needs to be replaced. To replace the lamp 140, one would need to only detach the side cover 130 and the back slice 160 of the lamp 140 that is damaged, and replace it with a new lamp, then associate the back slice 160 to the back board 150 by the slide 164 and the U-shaped chute 165 slipping into the channels 1251, 1252.

Figure 10:
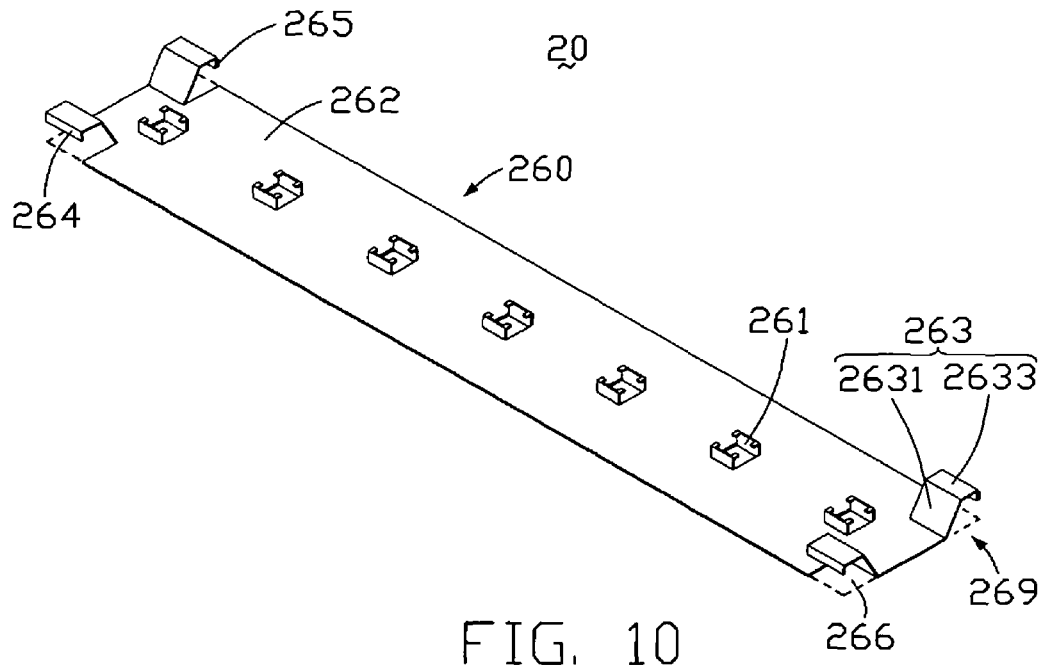
FIG. 10 is an enlarged isometric view of a back slice of an LCD according to a second embodiment of the present disclosure.

Referring to FIG. 10, an LCD 20 according to a second embodiment of the present disclosure is similar to the LCD 10. However, a back slice 260 includes a plurality of light sockets 261, a back piece 262, and four mini connectors 269. The back piece 262 is rectangularly shape. The four mini connectors 269 are disposed on two sides of each of two ends of the back piece 262, respectively. Each mini connector 269 includes a linker 263 and a slide 264 or a U-shaped chute 265. The linker 263 includes a plank 2631 and a flake 2633 connected to the plank 2631. The plank 2631 and the back piece 262 connected to the plank 2631 define an obtuse angle. The flake 2633 is parallel to the back piece 262. A first fasten organ, just like a slide 264, extends from an edge of one plank 2631 and perpendicular to the back piece 262. A second fasten organ, just like a U-shaped chute 265, extends from an edge of the other plank 2631. The mini connector 269 defines a gap 266 on the ends of the back piece 262. A projection of the mini connector 269 to the surface of the back piece 262 is just the gap 266. The light sockets 261 fasten light emitting diodes (LEDs) as a light source. Since each the back slice 260 can be detached and associated freely from a back board, so when the LED needs to be replaced, an exchanging process is convenient.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A direct backlight module comprising:
a first frame;
at least two light sources; and
a back board fixed to the first frame;
wherein the back board comprises at least two relative back slices connected to each other, the at least two back slices capable of being slipped out from the back board, each of the at least two back slices comprising a back piece, at least a first fasten organ, and at least a second fasten organ, the at least first fasten organ and the at least second fasten organ being disposed on opposite ends of the back piece separately, the at least two adjacent back slices connecting with each other by the at least first fasten organ and the at least second fasten organ, the at least first fasten organ being a slide, the at least second fasten organ having a U-shaped chute, an outline of the slide corresponding to an inline of the U-shaped chute, the first frame comprising two opposite disposed first side arms and two opposite disposed second side arms, each of the two opposite disposed first side arms comprising a channel inside, a cross-section of one first side arm's channel is L-shaped and corresponds to receive the slide, the other first side arm's channel including a passageway and a U-shaped channel, and
wherein a cross-section of the passageway is a beeline, the cross-section of the U-shaped channel is substantially U-shaped, and an end of the U-shaped channel links to the cross-section of an inside surface of the first side arm therein via the beeline.

2. The direct backlight module of claim 1, wherein the direct backlight module further comprises two side covers, each of the two side covers comprising at least one tenon, each of the second side arms comprising a concavity corresponding to the at least one tenon, the concavity capable of receiving the at least one tenon so as to fix the side covers to the second side arms, and the side covers capable of preventing the light source from slipping out of the direct backlight module.

3. The direct backlight module of claim 1, wherein each of the at least two light sources is a lamp, a number of the lamps is the same as a number of the at least two back slices, and the at least two light sources are received in the at least two back slices respectively.

4. The direct backlight module of claim 1, wherein the at least two light sources each comprise a plurality of light emitting diodes, and the light emitting diodes of each of the at least two light sources are fixed on the corresponding back slices.

5. A liquid crystal display comprising:
a liquid crystal panel; and
a direct backlight module comprising:
a first frame;
at least two light sources; and
a back board fixed to the first frame;
wherein the back board comprises at least two relative back slices connected to each other, the at least two back slices capable of being slipped out from the back board, each of the at least two back slices comprising a back piece, at least a first fasten organ, and at least a second fasten organ, the at least first fasten organ and the at least second fasten organ being disposed on opposite ends of the back piece separately, at least two adjacent back slices connecting with each other by the at least first fasten organ and the at least second fasten organ, the at least first fasten organ being a slide, the at least second fasten organ having a U-shaped chute, an outline of the slide corresponding to an inline of the U-shaped chute, the first frame comprising two opposite disposed first side arms and two opposite disposed second side arms, each of the two opposite disposed first side arms comprising a channel inside, a cross-section of one first side arm's channel is L-shaped and corresponds to receive the slide, the other first side arm's channel including a passageway and a U-shaped channel, and
wherein a cross-section of the passageway is a beeline, the cross-section of the U-shaped channel is substantially U-shaped, and an end of the U-shaped channel links to the cross-section of an inside surface of the first side arm therein via the beeline.

6. The liquid crystal display of claim 5, wherein the direct backlight module further comprises two side covers, each of the two side covers comprising at least one tenon, each of the second side arms comprising a concavity corresponding to the at least one tenon, the concavity capable of receiving the at least one tenon so as to fix the side covers to the second side arms, and the side covers capable of preventing the light source from slipping out of the direct backlight module.

7. The liquid crystal display of claim 5, wherein each of the at least two light sources is a lamp, a number of the lamps is the same as a number of the at least two back slices, and the at least two light sources are received in the at least two back slices respectively.

8. A direct backlight module comprising:
a frame;
at least two light sources; and
a back board fixed to the frame, the back board comprising at least two back slices corresponding to the at least two light sources respectively, each of the at least two back slices comprising a main body for receiving the corresponding light source, a first fasten organ connecting with an end of the main body, and a second fasten organ connecting with an opposite end of the main body, the first fasten organ comprising a slide, the second fasten organ comprising a chute,
wherein the chute of one of two adjacent back slices of the at least two back slices slidingly receives the slide of the other one back slice of the two adjacent back slices thereby the two adjacent back slices of the at least two back slices connect with each other, wherein the frame receives the back board and comprises two opposite disposed first side arms and two opposite disposed second side arms, each of the two opposite disposed first side arms comprising a channel inside, the at least two back slices slidingly connecting to each other one by one so as to form the back board,
wherein the channel of one of the two opposite disposed first side arms slidingly receives the slide of the first fasten organ of the back slice located at a first side of the back board, and the channel of the other opposite disposed first side arm slidingly receives the chute of the second fasten organ of the back slice located at a second side opposite to the first side of the back board.

9. The direct backlight module of claim 8, wherein a cross-section of each chute is U-shape, the cross-section of the channel for receiving the slide is L-shape, and the channel for receiving the chute comprises a passageway and a U-shaped channel corresponding to the chute.

10. The direct backlight module of claim 8, wherein the main body comprises a back piece and two links, the two links hold the back piece and form a room to receive the corresponding light source, and the first fasten organ and the second fasten organ connect with the two links respectively.

11. The direct backlight module of claim 10, wherein each of the at least two light sources is a lamp, the back piece comprising two holders disposed on two opposite ends of an inside surface of the back piece, and the two holders holding two ends of the lamp to fix the lamp on the inside surface of the back piece.

12. The direct backlight module of claim 10, wherein each of the at least two light sources comprises a plurality of light emitting diodes, the back piece comprising a plurality of light sockets, and the light sockets fasten the light emitting diodes respectively.

13. The direct backlight module of claim 12, wherein the back piece is substantially rectangular shape and includes four corners, each of the at least two back slices further comprising a first fasten organ and a second fasten organ, the main body further comprising two links, and the four links connecting between the four corners and the two first fasten organs and two second fasten organs.

14. The direct backlight module of claim 8, further comprising two side covers corresponding to the second side arms, each side cover comprising a plurality of tenons, wherein the two first side arms and the two second side arms form a rectangular structure, the rectangular structure comprising an opening defined in a middle thereof, each of the second side arms comprising a plurality of concavities corresponding to the plurality of tenons of the side cover, the tenons of each side cover received in the concavities of the corresponding second side arm so as to fix the side cover to the frame.

* * * * *